United States Patent
Bowles

[11] 3,832,103
[45] Aug. 27, 1974

[54] ISOSTATIC PRESS

[75] Inventor: Arnold G. Bowles, Warren, Pa.

[73] Assignee: National Forge Company, Irvine, Pa.

[22] Filed: Sept. 13, 1972

[21] Appl. No.: 288,703

[52] U.S. Cl............ 425/405 H, 425/261, 425/360, 425/DIG. 44, 264/109, 264/DIG. 50, 29/DIG. 34
[51] Int. Cl....... B30b 5/02, B30b 11/02, B28b 3/00
[58] Field of Search................................ 425/405 H

[56] References Cited
UNITED STATES PATENTS

| | | | |
|---|---|---|---|
| 3,477,096 | 11/1969 | Bowles et al..................... | 425/405 H |
| 3,550,198 | 12/1970 | Roberts........................ | 425/405 H X |
| 3,677,674 | 7/1972 | Bowles......................... | 425/405 H X |
| 3,730,666 | 5/1973 | Bowles......................... | 425/405 H |

Primary Examiner—J. Howard Flint, Jr.
Attorney, Agent, or Firm—Alfred L. Michaelsen

[57] ABSTRACT

An improvement for use in combination with an isostatic press of the type wherein a mold is inserted into a pressure cylinder having liquid therein. The improvement resides in providing means for preventing the tilting of the mold as it is inserted into the cylinder. Additionally, the means for preventing tilting may also be employed to insure that liquid overflowing from the cylinder is not discharged onto other parts of the machine.

14 Claims, 8 Drawing Figures

PATENTED AUG 27 1974　　3,832,103
SHEET 1 OF 5

ISOSTATIC PRESS

BACKGROUND OF THE INVENTION

1. Field to Which the Invention Pertains

Many commonly encountered articles are manufactured by pressing and compacting a powder material. For example, the insulating portion of spark plugs is commonly manufactured by filling a mold with insulating material in the form of a powder. Subsequently, the mold is subjected to a high pressure which results in a compaction of the material such that the final product is a substantially solid article.

Considering the manufacturing of an article such as a spark plug, it will be evident that a desirable approach would reside in subjecting all parts of the mold to a uniform pressure. A molding process which subjects a mold to such a uniform pressure is referred to as an isostatic molding process and the apparatus for practicing this process is generally referred to as an isostatic press. Typically, such presses operate in the following manner. The material to be compacted is placed within a sealed elastomeric mold. Subsequently, the mold is placed within a liquid containing vessel. The vessel is then sealed and the liquid pressure is increased to the desired level.

An improvement for use in combination with an isostatic press is the field to which this invention pertains.

2. Prior Art

In order to increase the production output of isostatic presses, a number of different constructions have been developed. For example, a typical high production isostatic press is disclosed in my co-pending U.S. patent application, Ser. No. 122,379, now U.S. Pat. No. 3,677,674, which is incorporated herein by reference. The isostatic press disclosed therein employs a support plate in the form of a turntable. The turntable is provided ith a number of apertures. Molds, having a flange, are placed within the apertures and depend downwardly therethrough such that the flange of the mold engages the support plate or turntable. The turntable may be rotated so as to sequentially position a mold within an isostatic press. More particularly, the turntable positions the mold above a pressure cylinder and below a pressure block having a plug depending downwardly therefrom. The pressure cylinder is slidably mounted on a lower arbor. Seals are provided for insuring a watertight seal between the stationary, lower arbor and the movable cylinder. In operation, a piston and cylinder arrangement raises the pressure cylinder. As the pressure cylinder rises, it is filled with water. Further, as the pressure cylinder rises, the upper surface thereof engages the flange attached to the mold and thus lifts the mold out of the turntable. Upward movement of the cylinder continues until the flange is pressed against the pressure block. Generally, a seal is provided around the top of the mold to seal the mold with respect to the pressure cylinder.

Although prior art isostatic presses as described above have operated with considerable success, some problems have been commonly encountered. For example, it has often been found that as the upper, inside surface of the pressure cylinder engages the seal carried by the mold, the mold is tilted. The tilting of the mold appears to arise from the fact that the seal, which is typically an O-ring, operates by providing an interference fit between the mold and the inner surface of the cylinder. Thus, because of this interference fit and because the mold is essentially hanging from the turntable, the cylinder may be tilted if there is a small amount of misalignment between the seal ring and the vessel or if distribution of weight in the molds is such that the center of gravity of the mold assembly does not correspond with vertical center line of the eal rung. Such as tilting of the mold is undesirable because it will cause the mold to jam betwen the top of the vessel and the underside of the block.

Another problem which has occurred when using isostatic presses of the type described above relates to the unwanted discharge of water. More particularly, as previously noted, the pressure cylinder is filled with water as it is raised. Thus, as the pressure cylinder surrounds the mold, the mold displaces water from the pressure cylinder. Water which is thus displaced commonly overflows into a water receiving jacket. However, when the pressure cylinder nears the point at which the upper, inner surface thereof will engage the seal carried by the mold, the area between the mold and the pressure cylinder is quite small. As such, high velocity jets of water may be produced which are dischared onto other parts of the machine. Clearly, this action results in undesirable operating conditions.

The invention disclosed herein obviates the above described problems associated with the operation of isostatic presses known to the prior art.

SUMMARY OF THE INVENTION

My invention solves the problem which attended the use of prior art isostatic presses by providing means for engaging the mold plate, from which the mold is suspended, before the top of the pressure cylinder engages the seal carried by the mold. The member which first engages the mold plate is movable with the pressure cylinder but resiliently mounted with respect to the pressure cylinder. Thus, the mold plate engaging member lifts the mold plate and the mold off a supporting surface. Subsequently, as the pressure cylinder moves upward, the mold plate which is being carried by the mold plate engaging member comes in contact with the upper pressure lock. At this point, since the mold plate engaging member is resiliently mounted with respect to the pressure cylinder, the pressure cylinder may continue to move upwards while the mold plate engaging member maintains the mold plate against the pressure block. Because the mold plate engaging member holds the mold plate against the pressure block, the mold will not tilt when the upper surface of the pressure cylinder engages the seal carried by the mold.

In one embodiment of the invention, a ring is provided around the outside of the pressure cylinder at the top thereof. Mounted on the ring, preferably as an integral part thereof, there is provided an annular plate. The ring and plate (an angle ring) are slidably mounted on the pressure cylinder. Springs are provided which upwardly bias the angle ring. Holes may be provided in a top portion of one segment of the ring. The holes communicate with an overflow box carried by the ring. In operation, the angle ring moves upward with the pressure cylinder but engages the mold plate before the pressure cylinder contacts the mold plate and before the pressure cylinder contacts the seal carried by the mold. As the pressure cylinder continues to move upward, the mold plate is carried by the angle ring. When the mold plate contacts and engages the pressure block, further movement of the pressure cylinder compresses the springs which provide the upward bias on the mold plate.

In another embodiment of the invention, a skirt is slidably mounted on the pressure cylinder and springs are provided to bias the skirt upwardly. The upper surface of the skirt is above the top surface of the pressure cylinder. As the pressure cylinder moves upward, the skirt first engages the mold plate. After further upward movement of the pressure cylinder, the mold plate contacts or engages the pressure block and is maintained against the pressure block by the skirt. Further upward movement of the pressure cylinder compresses the springs and effects a seal between the mold and the pressure cylinder.

Still another embodiment of the invention employs a plurality of pins, the top surface of which are above the top surface of the pressure cylinder. The pins are resiliently mounted on the pressure cylinder and function in a manner similar to that described above with respect to the lifting of the mold plate and the maintaining of the mold plate against the pressure block prior to and during the sealing of the mold with respect to the pressure cylinder.

The mold plate engaging member may be mounted directly or indirectly on the pressure cylinder.

DESCRIPTION OF THE PREFERRED EMBODIMENTS

FIGS. 1–4 inclusive show one embodiment of my invention. More particularly, in these figures as well as the other figures of the drawings, my invention is shown, by way of example, in combination with an isostatic press of the type disclosed in my co-pending U.S. Pat. application Ser. No. 122,379.

Figure 1:
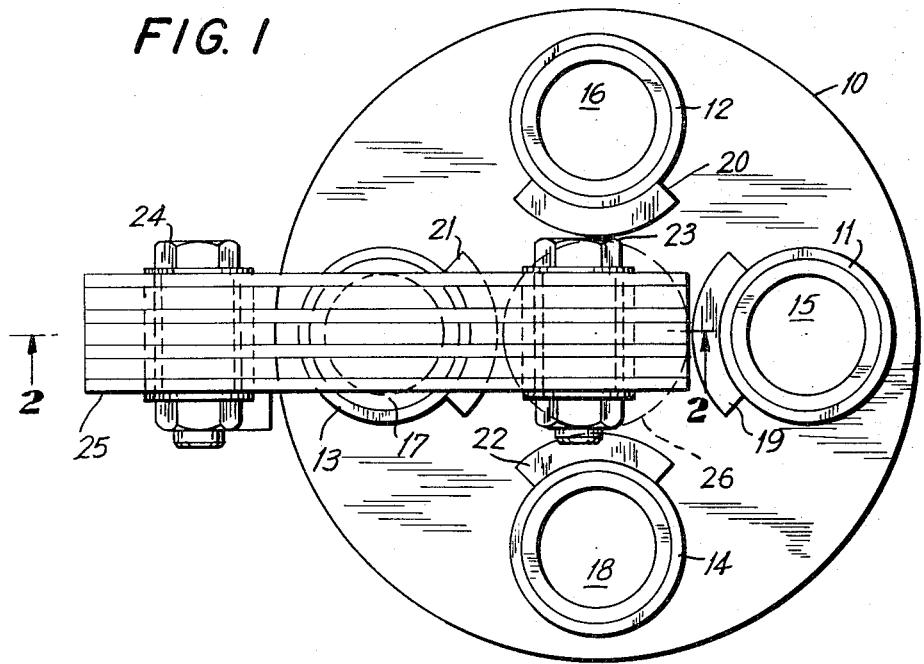
FIG. 1 is a top view of an isostatic press of the type which might be used in combination with my invention.

Considering the embodiment of my invention shown in FIGS. 1–4 inclusive, FIG. 1 is a top view of an anisostatic press of the type disclosed in my aforementioned co-pending U.S. patent application. More particularly, in an isostatic press of this type, there is provided a turntable 10 which is rotatably mounted on a vertical column 26. The turntable may be provided with four equally spaced apertures. Into each of these apertures, one may place a mold which is retained within the aperture by a flange or mold plate. For example, in FIG. 1 the turntable 10 carries four molds 15, 16, 17 and 18 which are provided with flanges or mold plates 11, 12, 13 and 14, respectively. As most clearly seen in FIG. 2, a mold, or example 17, depends downwardly through the turntable 10. The diameter of the aperture in the turntable is smaller than the outer diameter of the flange or mold plate 13. Thus, the mold plate 13 rests upon the turntable 10 and carries the mold 17 which depends downwardly therefrom. The turntable 10 may be provided with a number of apertures so that while a mold is being processed within the press, other molds may be inserted, filled or removed.

Figure 2:
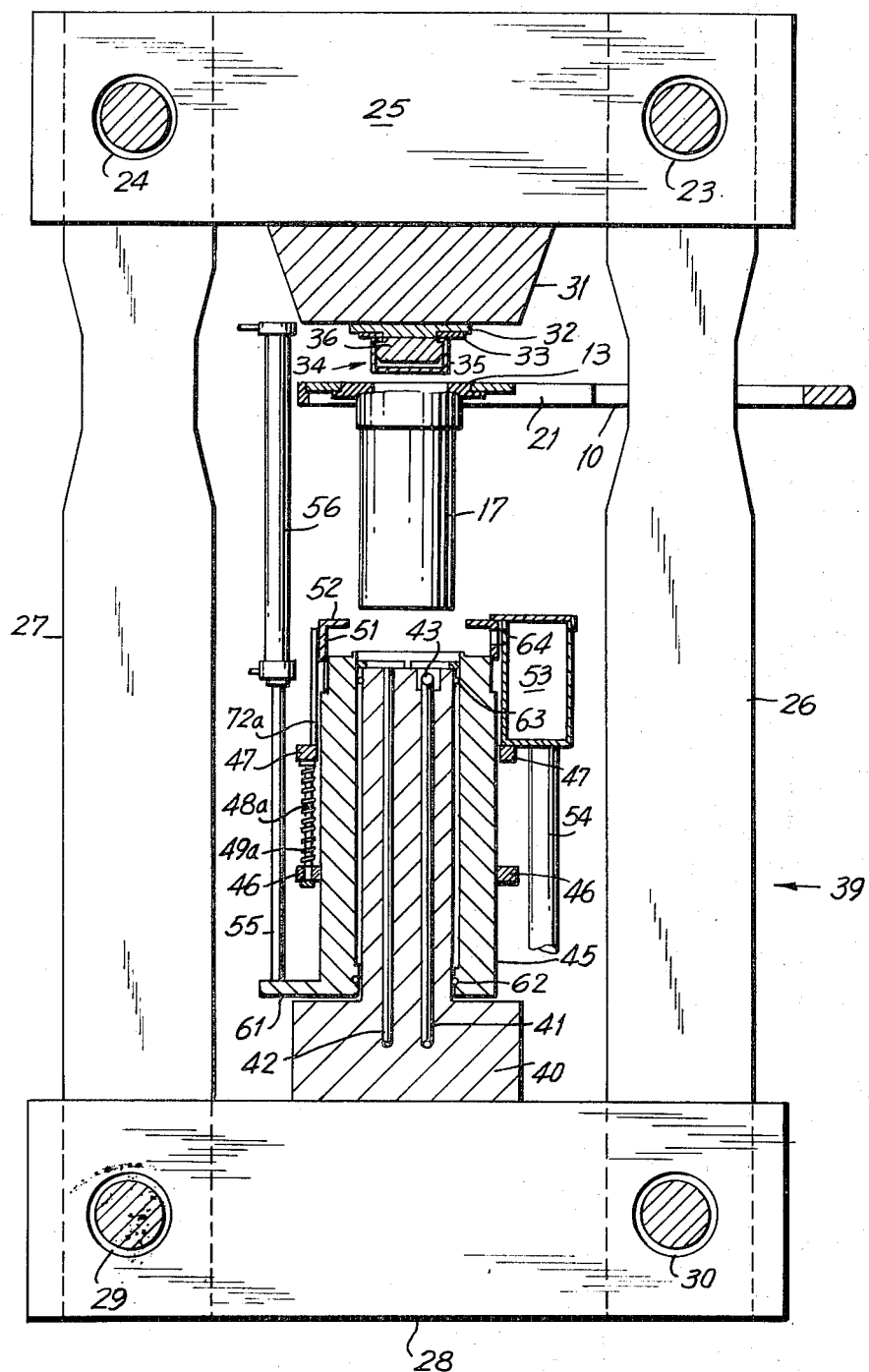
FIG. 2 is a side view, partly in section, taken along the section lines 2—2 of FIG. 1.

Referring particularly to FIG. 2, it may be seen that the isostatic press generally indicated as 39 includes two columns 26, 27, two cross members 25, 28 and connecting pins 23, 24, 29 and 30. Mounted on the lower cross member 28 is an arbor 40. Slidably mounted on the arbor 40 is a pressure cylinder 45. A liquid tight seal is obtained between the arbor 40 and the pressure cylinder 40 by seals 62, 63 which may be O-rings. Vertical movement of the pressure cylinder 45 occurs in response to movement of the piston 55 within the cylinder 55. The cylinder 56 may be affixed to the column 27 or to some other rigid, non-movable member.

Mounted on the upper cross member 25 and depending downwardly therefrom is a pressure block 31. Affixed to the bottom of the pressure block 31 is face plate 32. A bearing plate 33 is affixed to the lower surface of the face plate 32. Affixed to the lower surface of the bearing plate 33 is a plug 36 surrounded by an elastomeric cover 35.

The arbor 40 is provided with two liquid supply lines, viz. a low pressure liquid supply line 41 and a high pressure liquid supply line 42. Valve 43 is a non-return valve which opens during filling the vessel prior to pressurization. The valve corresponding to line 42 is external to the pressure vessel.

The elements of the isostatic press shown in FIG. 2 and which have been hereinbefore described, as well as the arrangement thereof, are known the prior art. The following comments describe the elements shown in FIG. 2, which, in combination with the isostatic press of FIG. 2, constitute one embodiment of my invention.

Fixedly attached to the outer surface of the pressure cylinder 45 is a lower ring 46. The ring 46 may be recessed in a circumferential groove in the pressure cylinder to fix the ring axially. To facilitate assembly, the ring 46 may be split into two halves. At equally spaced intervals around the ring, for example 120° apart, vertical holes are provided through the ring. Since the embodiment of my invention shown in FIG. 2 contemplates that there will be three such holes located 120° apart, only one such hole is visible in the side, sectional view of FIG. 2.

Through each of the holes, a guide rod, having a head at the lower end, is upwardly mounted. A precompressed helical compression spring is disposed around each of the guide rods and the top of the guide rod is affixed to an upper ring. Thus, in FIG. 2, it will be seen that there is provided a guide rod 48a which is slidably mounted through an aperture in the lower ring 46. Disposed about the guide rod 48a is a helical spring 49a which, in the preferred embodiment of my invention, is pre-compressed. The top of the guide rod 48a is affixed to the upper ring 47. Mounted on the top of the upper ring 47 are three support rods 72a, 72b and 72c. Once again, in the side, sectional view of FIG. 2, only the support rod 72a is visible. Fixedly attached to the support rods 72a, 72b and 72c, at the upper end thereof, is a ring 51 which is peripherally disposed about the pressure cylinder 45 at the top thereof. Mounted on the ring 51 or, as shown in the embodiment of FIG. 2, integral with the ring 51, there is provided an inwardly projecting, horizontal lip 52.

The ring 51 is provided with an overflow receiving box 53. Apertures 64 may be provided in the top of the ring 51 and the box 53 in order to permit liquid to enter the box 53 and flow out therefrom through overflow pipe 54.

Figure 3:
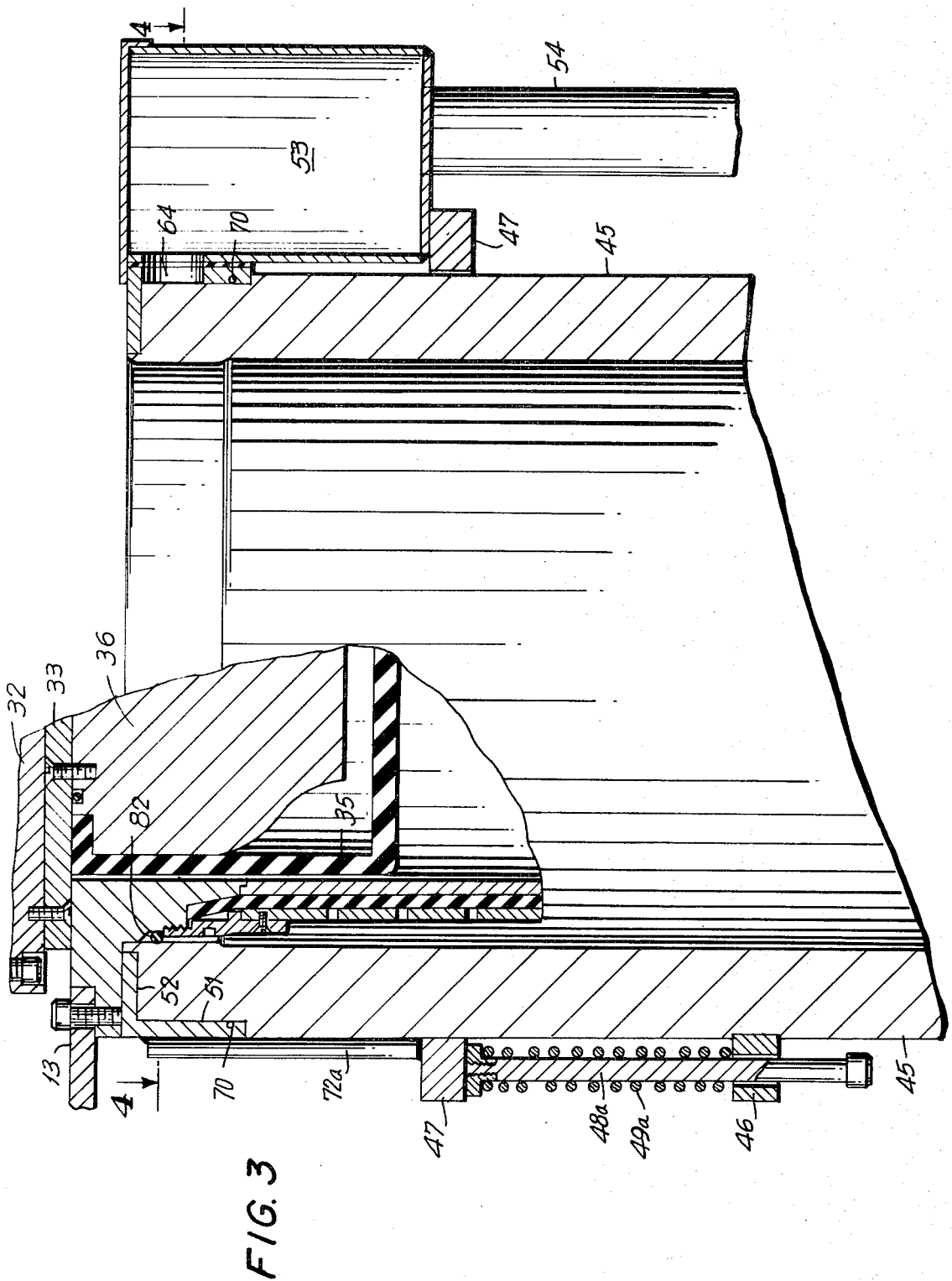
FIG. 3 is a side view, partly in section and having a portion thereof exploded, of certain parts of the apparatus seen in FIG. 2.

In order to understand how my invention solves the problems which heretofore attended the use of isostatic presses, reference is made to both FIG. 2 and FIG. 3 wherein FIG. 3 shows the arrangement of certain of the components shown in FIG. 2 when the pressure cylinder is in its upper most position. Thus, as the pressure cylinder 45 commences to move upward from its lower most position as shown in FIG. 2, water is pumped into the vessel through non-return valve opening 43 to fill the void defined by the rising pressure cylinder. As the pressure cylinder rises, the lower ring, which is affixed to the pressure cylinder 54, rises and transmits its upward motion to the upper ring 47 through the springs 49a–49c. Thus, the inwardly projecting lip 52 rises with the pressure cylinder 45. Moreover, as water fills the interior of the pressure cylinder, any excess water flowing into the cylinder overflows into the ring and is conducted therefrom by flowing through the apertures 64, into the overflow box 53 and is discharged through the overlfow pipe 54. A seal 70 (FIG. 3) provides a liquid seal between the ring 51 and the outer wall of the pressure cylinder 45.

As the pressure cylinder continues to rise, the upper surface of the inwardly projecting lip 52 will approach and contact or engage the lower surface of the mold plate 13. As the lip 52 contacts the mold plate 13 and the mold is raised off the turntable 10. The precompression in the three springs 49a, 49b and 49c is such that the weight of the mold assembly will not deflect the springs. The relative positions of rings 46 and 47 therefore remain the same as prior to the lifting of the mold from the turntable.

As the pressure cylinder 45 rises further, the upper surface of the mold plate 13 will come in contact with or engage the bearing plate 33. Since the bearing plate 33 is fixedly mounted on the pressure 39, it will prevent or restrain further upward movement of the mold 17. Thus, as the pressure cylinder 45 thereafter continues to rise, the springs 49a, 49b and 49c will be compressed. This compression of the springs provides an upward force to the inwardly projecting lip 52. Since the mold plate 13 is, at this point, sandwiched between the bearing plate 33 and the inwardly projecting lip 52, the upward force arising from the additional compression of the springs tends to resiliently clamp the mold plate. As a result, if the mold plate is not accurately centered with respect to the vore of the vessel, tilting of the mold cannot occur as the seal 82 engages the vessel 45. Any small misalignment will result in the mold plate moving perpendicular to the center line of the vessel 45. (The movement involved may be a hundredth of an inch or so). As such, tilting of the mold plate 17, which previously occurred due to misalignment, is prevented.

Additionally, it will be appreciated that as the pressure cylinder reaches the top of its upward movement, the annular area between the top of the pressure cylinder and the mold is continuously decreasing. Thus, excess water provided to the interior of the pressure cylinder will be discharged through a small area and will thus have a high velocity. However, because of the presence of the inwardly projecting lip 52 and the ring 51, water squirting out between the small annular area is prevented from discharging onto other surfaces of the machine. Any such water is discharged against the bottom surface of the inwardly projecting lip 52 and flows out to the overflow box 53 through the apertures 64.

As hereinbefore pointed out, the overflow box 53 is attached to the ring 51. Since the ring 51 and the inwardly projecting lip 52 must pass through the turntable, it is therefore necessary in this embodiment of my invention to provide a cutout in the turntable. Thus, referring to FIG. 1, it may be noted that cutouts 19, 20, 21 and 22 are provided to permit the overflow box 53 to pass there through.

Figure 4:
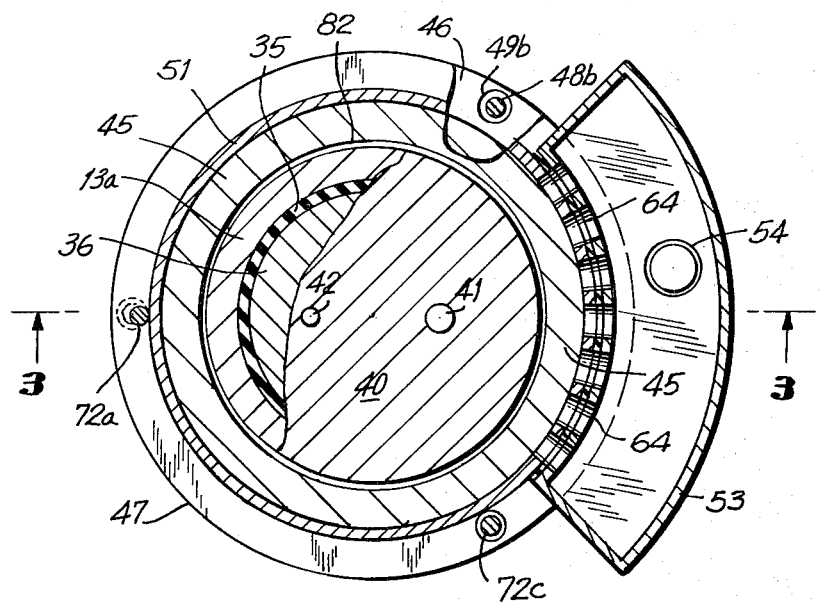
FIG. 4 is a top sectional view, taken along the section lines 4—4 of FIG. 3, with certain parts thereof broken away.

Referring to FIGS. 3 and 4, the configuration and arrangements of the various elements after sealing can most clearly be seen. Thus, it will be seen that the spring 49a has been compressed as indicated by the portion of the guide rod 48a which is extending downwardly past the lower ring 46. Referring to FIG. 4, the overall arrangement of various parts will be seen. Thus, the support rods 72a and 72c, which are affixed to the ring 51, are clearly shown as being spaced about the periphery of the pressure cylinder 45. At the upper right corner of FIG. 4, a section has been broken away to show the lower support ring 46, the guide rod 48b and the spring 49b associated therewith. Similarly, a center section of FIG. 4 has been broken away to show the lower arbor 40. To further facilitate a comprehension of the correspondence between FIGS. 2, 3 and 4, it should be noted that the same section lines have been consistently used in all views.

Summarizing the operations of the embodiment of my invention shown in FIGS. 1–4 inclusive, it will be appreciated that the problem of mold tilting when the pressure cylinder engages the seal of the mold has been substantially eliminated by the improvement which comprises my invention in that the mold plate is resiliently clamped against the bearing plate before the pressure cylinder engages the seal carried by the mold, i.e. before sealing occurs between the mold and the pressure cylinder.

Figure 6:
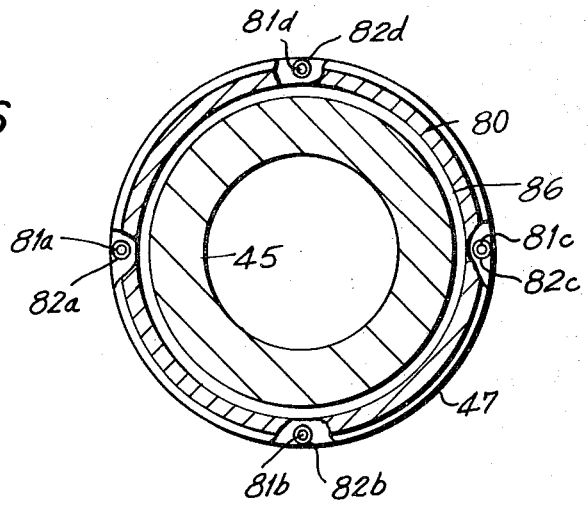
FIG. 6 is a top view of the embodiment of FIG. 5.
Figure 5:
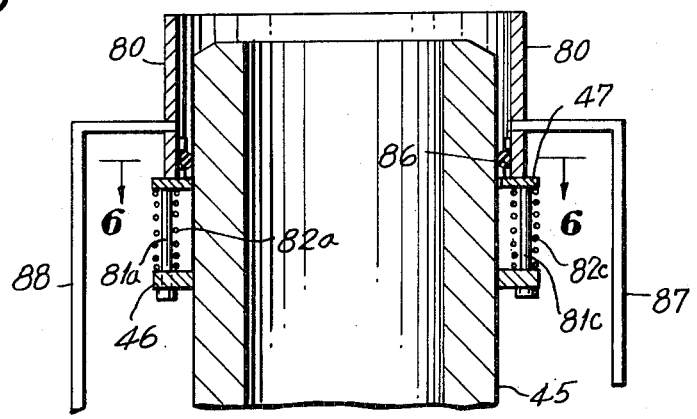
FIG. 5 is a fragmentary, side view, partly in section, showing a preferred embodiment of my invention.

FIGS. 5 and 6 show another embodiment of my invention. In FIG. 5, only the upper portion of the pressure cylinder 45 is shown since the remaining portions of the elements which comprise an isostatic press would or could be the same as those shown in FIGS. 1 and 2.

In the embodiment of FIG. 5 and 6, it will be seen that a skirt or jacket 80 is peripherally disposed about the pressure cylinder 45 and mounted on an upper ring 47. Disposed beneath the ring 47 is a lower ring 46 which is fixedly attached to the pressure cylinder 45. Mounted through the lower ring 46 are four guide rods 81a, 81b, 81c and 81d only two of which are visible in the side view of FIG. 5. As may be seen in FIG. 6, the guide rods are equally spaced around the periphery of the pressure cylinder 45. In general, the upper ring 47, the lower ring 46, the four guide rods 81a–81d and the four compression springs 82a–82d cooperate in the same manner with respect to the skirt 80 as was heretofore described with respect to the embodiment of my invention shown in FIGS. 1–4. Thus, in the embodiment of FIGS. 5 and 6, as the pressure cylinder 45 is raised, he upper surface of the skirt 80 contacts and engages the mold plate before the upper surface of the pressure cylinder 45 engages the seal carried by the mold. As the pressure cylinder 45 continues to rise, the mold weight is transferred to the precompressed springs. Thereafter, the mold is lifted off the turntable 10 and rises with the cylinder, the mold plate resting on the top of the skirt 80. After the mold plate contacts and engages the bearing plate 33, the mold plate is resiliently clamped against the bearing plate as the pressure cylinder 45 continues to rise and further compresses the springs 82a–82d. Subsequently, the top, inner surface of the pressure cylinder 45 engages the seal carried by the mold and the pressure cylinder is sealed with respect to the mold.

During the period when the mold is rising and filling with water, any excess water overflows into the annulus between the pressure cylinder 44 and the skirt 80. A seal 86 is provided between the skirt 80 and the pressure cylinder 45. Additionally, overflow pipes 87, 88 are provided to conduct away any water which overflows from the pressure cylinder. Moreover, it will be appreciated that because the upper surface of the skirt 80 extends past the upper surface of the pressure cylinder 45, the skirt 80 will contact the mold plate at approximately the time when a diminishing annulus is forming between the top of the mold and the top of the pressure cylinder 45. Thus, any high velocity jets of liquid which might be discharged at this time would strike the top of the mold plate and be diverted into the annulus between the pressure cylinder 45 and the skirt 80. Thus, this embodiment intrinsically provides a degree of protection from discharging liquid onto other parts of the machine while not requiring the presence of an inwardly projecting lip. Additionally, another attribute of this embodiment of my invention resides in the absence of an overflow box thus permitting the use of a turntable which does not have to be provided with arcuate cutouts such as those provided in the turntable 10 as shown in FIG. 1.

Figure 8:
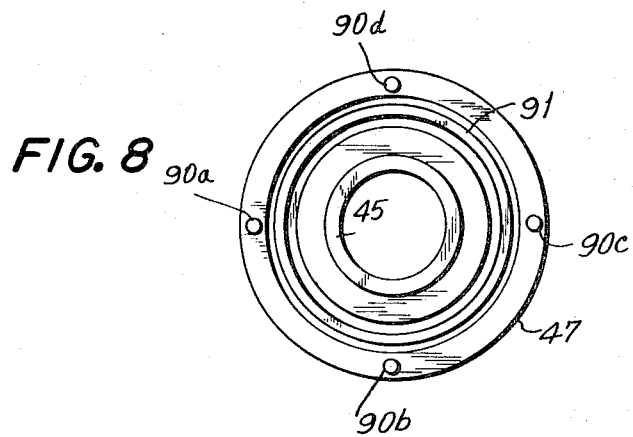
FIG. 8 is a top view of the embodiment of FIG. 7.
Figure 7:
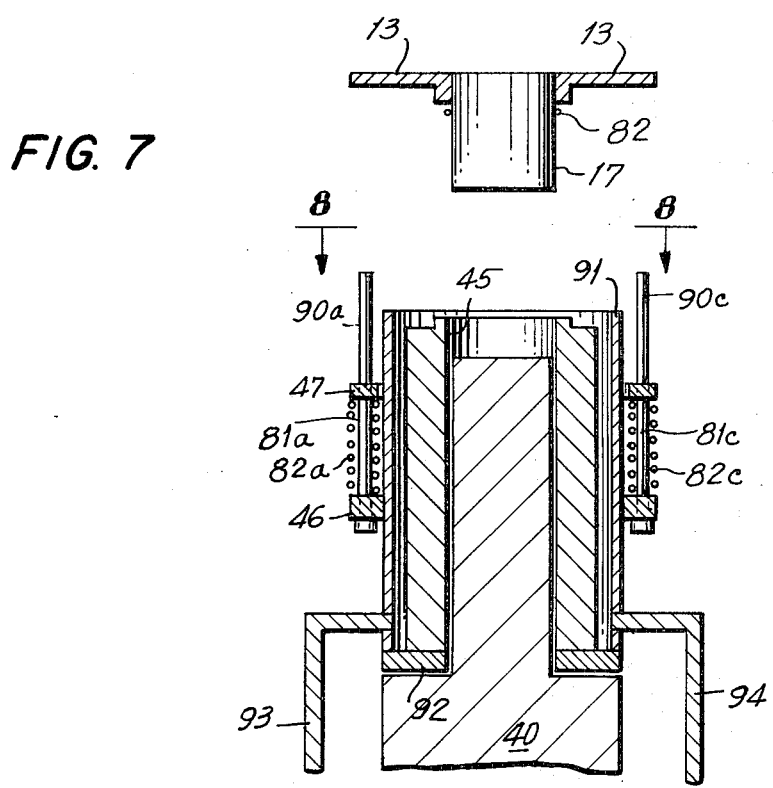
FIG. 7 is a fragmentary, side view, partly in section showing another embodiment of my invention.

FIGS. 7 and 8 show another embodiment of my invention. In this embodiment, the same resilient mounting means are employed as in the embodiment of my invention heretofore described, i.e. a fixedly mounted lower ring 46 and an upper, movable ring 47. Similar to the embodiment of FIGS. 5 and 6, four guide rods 81a, 81b, 81c and 81d are equally spaced around the lower ring 46 and mounted upwardly through the lower ring 46 and connect with the upper ring 47. Compression springs 82a, 82b, 82c and 82d are provided for resiliently supporting the upper ring 47. However, in contrast to the embodiment of my invention previously described, it will be noted that the lower ring, in the embodiment of FIGS. 7 and 8, is fixedly attached to a skirt or jacket 91 which, in turn, is mounted on the base 92 which carries the pressure cylinder 45. Thus it will be seen that in this embodiment the skirt or jacket 91 is not movable with respect to the pressure cylinder 45. Mounted on the upper ring 47 are four pins 90a, 90b, 90c and 90d. The pins 90a–90d are mounted on the upper ring in alignment with the guide rod 81a–81d. As may be seen in FIG. 7, the upper surface of the pins 90a–90d is above both the upper surface of the skirt 91 and the pressure cylinder 45 when the springs 82a–82d are compressed.

As the pressure cylinder 45 rises, the upper surface of the pins 90a–90d will contact the lower surface of the mold plate 13 before the pressure cylinder contacts or engages the seal 82. As the pressure cylinder 45 continues to rise, the mold weight is transferred to the precompressed springs and, thereafter, the mold 17 will be carried upward by the pins 90a–90d. As with the other embodiments of my invention, the mold plate 13 is then resiliently clamped against the bearing plate (not shown in FIG. 7). Thereafter, continued upward movement of the pressure cylinder 45 compresses the springs 81a–81d and the pressure cylinder engages the seal 82. During the upward movment of the pressure cylinder 45, excess water overflows into the annulus between the pressure cylinder and the fixedly mounted skirt 91. As water accumulates in this annulus, it may be conducted away by overflow pipes 93, 94.

It will be appreciated that this embodiment of my invention is not as effective as the other embodiments previously described with respect to preventing the discharge of high velocity water jets onto other parts of the press. However, if such water discharge is a problem, substantially the same embodiment of my invention can be used while preventing such discharge by replacing the four pins with a second skirt mounted on the upper ring 47. Thus, the skirt will act as a mold plate engaging member and function to provide the required resilient clamping action of the mold plate in the same manner as the mold plate engaging members of the other embodiments of my invention functioned. In the event that a skirt is used in place of the pins 90a–90d, it may be desirable to provide a seal between the skirt mounted on the upper ring 47 and the skirt 91. The purpose of this seal is to insure that any high velocity jets of water which are directed into the annulus between the skirt 91 and the skirt comprising the mold plate engaging member does not discharge downwardly onto the upper ring 47 and the springs mounted below. Additionally, it may be desirable to provide an overflow pipe connecting the overflow pipes 93, 94 to the annulus between the skirt 91 and the skirt mounted on the upper ring 47.

Regardless of whether pins or a skirt is used to realize the embodiment of FIGS. 7 and 8, this embodiment has certain advantages over previously described embodiments in that the means for resiliently mounting the mold plate engaging member is indirectly, rather than directly, mounted on the pressure cylinder 45, i.e. the lower ring 46 is mounted on the skirt 91 and the skirt 91 is fixedly mounted with respect to the pressure cylinder 45. Such an arrangement may be desirable since the combination of a skirt mounted on a base which is common to the pressure cylinder represents a construction known to the prior art and now in use. Thus, the embodiment of FIGS. 7 and 8 would be especially attractive to one who desired to use my invention in combination with an existing isostatic press.

As hereinbefore pointed out, my invention broadly contemplates providing a mold plate engaging member and means for resiliently mounting the mold plate engaging member, either directly or indirectly on the pressure cylinder such that the upper surface of the mold plate engaging member is above the upper surface of the pressure cylinder when the mold plate is resting on or being carried by the mold plate engaging member. Additionally, if the particular embodiment used to practice my invention does not intrinsically provide means for receiving liquid which overflows from the pressure cylinder, liquid overflow receiving means may be provided.

Although a number of embodiments of my invention have been described, other variations thereof may occur to those skilled in this art without, nevertheless, departing from the scope of my invention as defined by the claims appended hereto.

I claim:

1. In combination with an isostatic press having a pressure cylinder which receives a mold having a mold plate and means for sealing said pressure cylinder with respect to said mold when said mold is in said pressure cylinder, the improvement which comprises:
   a. a mold plate engaging member; and
   b. means for resiliently mounting said mold plate engaging member on said pressure cylinder such that said sealing means is not engaged when said mold plate is resting on said mold plate engaging member.

2. The apparatus of claim 1 wherein said mold plate engaging member comprises a skirt surrounding said pressure cylinder.

3. The apparatus of claim 2 which further comprises:
   a. means for providing a liquid seal between said skirt and said pressure cylinder; and
   b. means for discharging liquid which overflows from said pressure cylinder into the annulus between said skirt and said pressure cylinder.

4. The apparatus of claim 2 wherein said resiliently mounting means comprises:
   a. a lower ring fixedly attached to and surrounding said pressure cylinder;
   b. an upper ring connected to the lower end of said skirt and slidably mounted around said pressure cylinder;
   c. a plurality of guide rods slidably mounted through said lower ring and connected at one end to said upper ring; and
   d. means for providing an upward bias force on said upper ring.

5. The apparatus of claim 4 wherein said means for providing an upward bias force comprises a compression spring disposed around each of said guide rods and between said upper ring and said lower ring.

6. The apparatus of claim 5 wherein all of said compression springs are precompressed.

7. The apparatus of claim 6 which further comprises:
   a. means for providing a liquid seal between said skirt and said pressure cylinder; and
   b. means for discharging liquid which overflows from said pressure cylinder into the annulus between said skirt and said pressure cylinder.

8. The apparatus of claim 1 wherein said mold plate engaging member comprises a plurality of upstanding pins substantially equally spaced around the periphery of said pressure cylinder.

9. The apparatus of claim 8 which further includes liquid overflow receiving means for receiving liquid for overflows from said pressure cylinder.

10. The apparatus of claim 9 wherein said liquid overflow receiving means comprises:
    a. a jacket surrounding said pressure cylinder and defining a liquid receiving annulus between said pressure cylinder and said jacket; and
    b. means for discharging liquid which accumulates in said annulus.

11. The apparatus of claim 9 wherein said means for resiliently mounting said plurality of upstanding pins comprises:
    a. a lower ring fixedly attached to and surrounding said jacket;
    b. an upper ring surrounding said jacket and vertically movable with respect to said jacket, said upper ring connected to the lower end of plurality of pins;
    c. a plurality of guide rods slidably mounted through said lower ring and connected at one end to said upper ring; and
    d. means providing an upward bias force on said upper ring.

12. The apparatus of claim 2 which further comprises an inwardly projecting lip affixed to said skirt at the top edge thereof.

13. The apparatus of claim 12 which further comprises:
    a. means providing a liquid seal between the bottom of said skirt and said pressure cylinder;
    b. a liquid overflow box mounted on said skirt adjacent to the top thereof and in fluid communication with the interior of said skirt; and
    c. means for discharging liquid which flows into said liquid overflow box.

14. The apparatus of claim 13 wherein said resiliently mounting means comprises:
    a. a lower ring fixedly attached to and surrounding said pressure cylinder;
    b. an upper ring slidably mounted around said pressure cylinder connected to the lower end of said skirt;
    c. a plurality of guide rods slidably mounted through said lower ring and connected at one end to said upper ring; and
    d. means for providing an upward bias force on said upper ring.

* * * * *

UNITED STATES PATENT OFFICE
CERTIFICATE OF CORRECTION

Patent No. 3,832,103      Dated August 27, 1974

Inventor(s) Arnold G. Bowles

It is certified that error appears in the above-identified patent and that said Letters Patent are hereby corrected as shown below:

Column 2, line 8, the word "eal" should be --seal--

Column 2, line 24, the word "dischared" should be --discharged--

Column 3, line 57, the word "aniso" should be --iso--

Column 4, line 21, the number "55" should be --56--

Column 4, line 39, before "the" second occurrence insert --to--

Column 5, line 24, the number "54" should be --45--

Column 7, line 6, the word "he" should be --the--

Column 7, line 23, the number "44" should be --45--

Column 2, line 8, the word "rung" should be -- ring --.

Signed and sealed this 26th day of November 1974.

(SEAL)
Attest:

McCOY M. GIBSON JR.
Attesting Officer

C. MARSHALL DANN
Commissioner of Patents